US012513458B2

(12) United States Patent
Burnett

(10) Patent No.: US 12,513,458 B2
(45) Date of Patent: Dec. 30, 2025

(54) ADVANCED SPEECH ENCODING DUAL MICROPHONE CONFIGURATION (DMC)

(71) Applicant: Jawbone Innovations, LLC, Marshall, TX (US)

(72) Inventor: Gregory C. Burnett, Northfield, MN (US)

(73) Assignee: Jawbone Innovations, LLC, Marshall, TX (US)

( * ) Notice: Subject to any disclaimer, the term of this patent is extended or adjusted under 35 U.S.C. 154(b) by 898 days.

(21) Appl. No.: 17/746,702

(22) Filed: May 17, 2022

(65) Prior Publication Data

US 2022/0394381 A1 Dec. 8, 2022

Related U.S. Application Data

(63) Continuation of application No. 14/149,805, filed on Jan. 7, 2014, now Pat. No. 11,638,092, which is a continuation of application No. 12/123,364, filed on May 19, 2008, now Pat. No. 8,625,816.

(60) Provisional application No. 60/931,637, filed on May 23, 2007.

(51) Int. Cl.

| | |
|---|---|
| ***H04R 3/00*** | (2006.01) |
| ***G10L 21/0208*** | (2013.01) |
| ***G10L 21/0216*** | (2013.01) |

(52) U.S. Cl.
CPC .......... *H04R 3/005* (2013.01); *G10L 21/0208* (2013.01); *G10L 2021/02165* (2013.01); *H04R 2410/05* (2013.01)

(58) Field of Classification Search
CPC ................ H04R 3/005; H04R 2410/05; G10L 2021/02165; G10L 21/0208
See application file for complete search history.

(56) References Cited

U.S. PATENT DOCUMENTS

| | | | | |
|---|---|---|---|---|
| 7,146,013 | B1 * | 12/2006 | Saito | H04R 3/005 381/92 |
| 7,561,700 | B1 * | 7/2009 | Bernardi | H04R 29/006 381/313 |
| 2003/0228023 | A1 * | 12/2003 | Burnett | G10L 25/93 381/91 |

* cited by examiner

*Primary Examiner* — Marcos D. Pizarro
(74) *Attorney, Agent, or Firm* — Nutter McClennen & Fish LLP

(57) ABSTRACT

A microphone array is described for use in ultra-high acoustical noise environments. The microphone array includes two directional close-talk microphones. The two microphones are separated by a short distance so that one microphone picks up more speech than the other. The microphone array can be used along with an adaptive noise removal program to remove a significant portion of noise from a speech signal of interest.

20 Claims, 4 Drawing Sheets

100
All measurements from the front side of the tab
To Boom
101
106
Vents ~ 2 mm less in diameter than the mics
104
Open Area
Mic Front
To mouth
G2
G1
20.8
D
TOP VIEW To mouth
G1
100
G2
SIDE Vents ~ 2 mm less in diameter than the mics
106
To Boom
G1
As small as possible
As small as possible
100
FRONT FRONT
3.6
G1 and/or G2
SIDE
3.8
7.9
2.0
0.6
1.1
Mic Details

ADVANCED SPEECH ENCODING DUAL MICROPHONE CONFIGURATION (DMC)

CROSS-REFERENCE TO RELATED APPLICATIONS

This application is a continuation of U.S. patent application Ser. No. 14/149,805, filed Jan. 7, 2014, which is a continuation of U.S. patent application Ser. No. 12/123,364, filed on May 19, 2008 (now U.S. Pat. No. 8,625,816), which claims the benefit of U.S. Provisional Patent Application No. 60/931,637, filed on May 23, 2007. U.S. patent application Ser. No. 12/123,364 is also related to U.S. patent application Ser. No. 10/667,207, filed on Sep. 18, 2003 (now U.S. Pat. No. 8,019,091), which claims the benefit of U.S. Provisional Patent Application No. 60/219,297, filed on Jul. 19, 2000. U.S. patent application Ser. No. 10/667,207 is also a continuation-in-part of U.S. patent application Ser. No. 09/905,361, filed on Jul. 12, 2001, which claims the benefit of U.S. Provisional Patent Application No. 60/219,297, filed on Jul. 19, 2000. U.S. patent application Ser. No. 12/123,364 is also related to U.S. patent application Ser. No. 10/301,237, filed on Nov. 21, 2002, which claims the benefit of U.S. Provisional patent application Ser. No. 60/219,297, filed on Jul. 19, 2000. U.S. patent application Ser. No. 10/301,237 is also a continuation-in-part of U.S. patent application Ser. No. 09/905,361, filed on Jul. 12, 2001, which claims the benefit of U.S. Provisional Patent Application Ser. No. 60/219,297, filed on Jul. 19, 2000. Each of these patent applications is hereby incorporated herein by reference in its entirety.

FIELD

The disclosure herein relates generally to communication systems. In particular, this disclosure relates to microphone configurations for use in communication systems.

BACKGROUND

Most environments have unwanted noise. The noisy environment makes voice communication between human speakers difficult. The communication between speakers is especially difficult when the speakers are communicating via microphones coupled to electronic devices (e.g., communication radios, cellular telephones, etc.).

DETAILED DESCRIPTION

Disclosed herein is a novel microphone array for use in ultra-high acoustical noise environments. The microphone array, referred to herein as a dual microphone configuration (DMC), includes two microphones. In an embodiment two directional close-talk microphones are separated by a short distance so that one microphone picks up more speech than the other. The microphone array can be used along with an adaptive noise removal program such as the Pathfinder system to remove a significant portion of the noise from a desired speech signal. The Pathfinder system, which is available from Aliph, San Francisco, Calif., is described in detail in the Related Applications.

In the following description, numerous specific details are introduced to provide a thorough understanding of, and enabling description for, embodiments of the DMC. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The following terms are intended to have the following general meanings as they are used herein.

The term "denoising" means the amount of reduction of noise energy in a signal in decibels (dB).

The term "devoicing" means the loss of desired speech energy in dB.

The phrase "voice activity detection" or "VAD" means the detection of voiced and unvoiced speech.

The term "G1" means gradient microphone 1.

The term "G2" means gradient microphone 2.

The term "Mic1" means the microphone that captures the most speech.

The term "Mic2" means the microphone that captures the least speech.

Figures 1A, 1B, 1C, 1D:
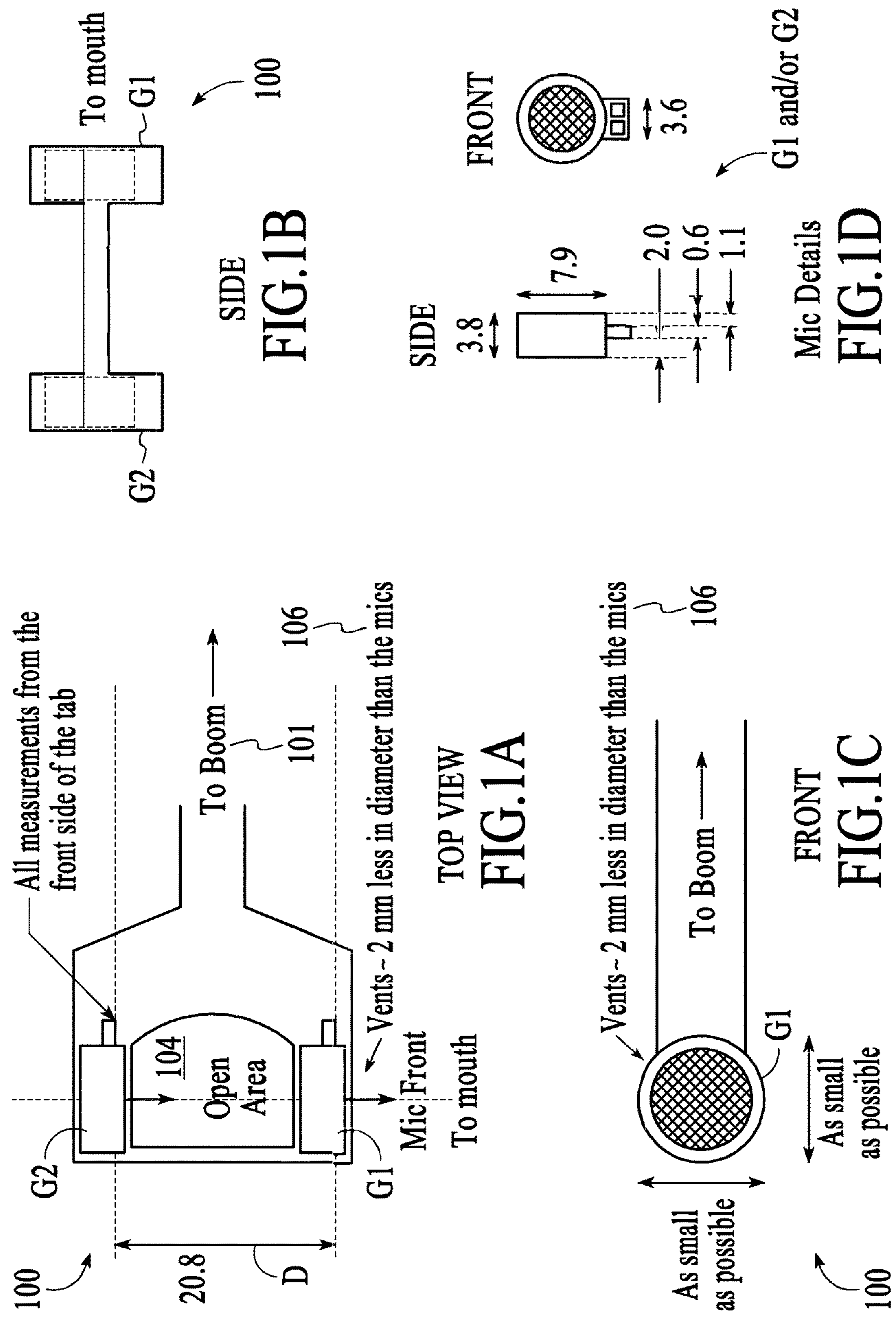
FIG. 1A is a top view of a dual microphone configuration (DMC), under an embodiment.
FIG. 1B is a side view of the DMC, under an embodiment.
FIG. 1C is a front view of the DMC, under an embodiment.
FIG. 1D shows dimensions of a microphone of the DMC, under an embodiment.

FIG. 1A is a top view of a dual microphone configuration (DMC) 100, under an embodiment. FIG. 1B is a side view of the DMC 100, under an embodiment. FIG. 1C is a front view of the DMC 100, under an embodiment. FIG. 1D shows dimensions of a microphone of the DMC 100, under an embodiment. The DMC provides a configuration in which both microphones respond to noise with the same sensitivity, but the microphone closest to the speaker's mouth has a higher sensitivity to speech. All dimensions shown on FIGS. 1A-1D are in millimeters (mm) unless otherwise stated herein.

The DMC of an embodiment includes a housing 101 (also referred to as a boom 101) having two receptacles. The receptacles receive and hold two microphones G1 and G2. The boom is generally connected or coupled to a device that can be worn by a speaker, for example, a headset or earpiece (not shown) that positions or holds the microphones in the vicinity of the speaker's mouth. The microphones of an embodiment are Gentex 3207-5 microphones, but the embodiment is not limited to these microphones. The array of an embodiment places a first directional microphone G1 (e.g., Mic1, the "speech" microphone) in the position normally occupied by a close-talk (gradient) microphone. Thus, the position of Mic1 is generally directly or nearly directly in front of the speaker's lips and only a few millimeters from the lips; as an example, the close-talk microphone Mic1 is a distance in a range of approximately 0 to 10 mm from the speaker's lips. The microphone Mic1 has a first vector normal to a front of the microphone, and the first vector is approximately parallel with an axis defined by, in this embodiment, the boom, and the axis is oriented in a direction toward a mouth of the speaker.

A second directional microphone G2 (e.g., Mic2, the "noise" microphone) is placed a distance behind Mic1. The distance of an embodiment is in a range of a few centimeters behind Mic1. For example, the distance between the microphones is in a range of approximately 1 millimeter (mm) to 30 mm. As another example, the distance between the microphones is in a range of approximately 30 mm to 50 mm. Due to the proximity effect, the speech will be significantly stronger in Mic1 than in Mic2, but the noise response should be about the same, greatly facilitating the noise removal process. An open area 104 separates the first and second microphones, but the embodiment is not so limited. The open area 104 of an embodiment comprises air. Furthermore, a vent 106 (not shown on figure) is optionally placed in proximity to the first microphone.

The second microphone Mic2 is connected to the boom, and has a second vector normal to the front of the second microphone Mic2. The second vector forms an angle relative to the first vector of the first microphone Mic1. In an embodiment, the angle between the first vector and the second vector is approximately zero (0) degrees. In another embodiment, the angle between the first vector and the second vector is in a range of approximately zero (0) degrees to 45 degrees. The first vector is separated from the second vector by a vector distance in a range of approximately zero (0) to 15 mm.

As a more specific example embodiment, the microphones G1/G2 of an embodiment are parallel to each other and separated by a distance D of approximately 20.8 mm apart. However, the microphones G1/G2 are not required to be parallel to each other and are not required to separated by this exact spacing. Any distance D may separate the two microphones with the understanding that the smaller the distance D, the better the denoising, but the more devoicing. A larger separation D between the microphones can lead to poorer denoising, but less devoicing. Thus, the spacing D of 20.8 mm was determined to provide good denoising performance and acceptable devoicing. Optimum performance was observed when the noise microphone Mic2 is parallel to Mic1 and on the same axis as Mic1, but the embodiment is not so limited.

The DMC 100 is symmetric and is used in the same configuration or manner as a single close-talk microphone. If one of the gradient microphones is designated as G1 and the other as G2, then either microphone can be placed closest to the mouth and designated as Mic1. The other gradient microphone then assumes the role of Mic2. Either microphone may fulfill each role, as the proximity effect is used to determine which microphone is Mic1 and which microphone is Mic2 (e.g., Mic1 is the microphone in which speech is much louder than in Mic2).

Figure 2:
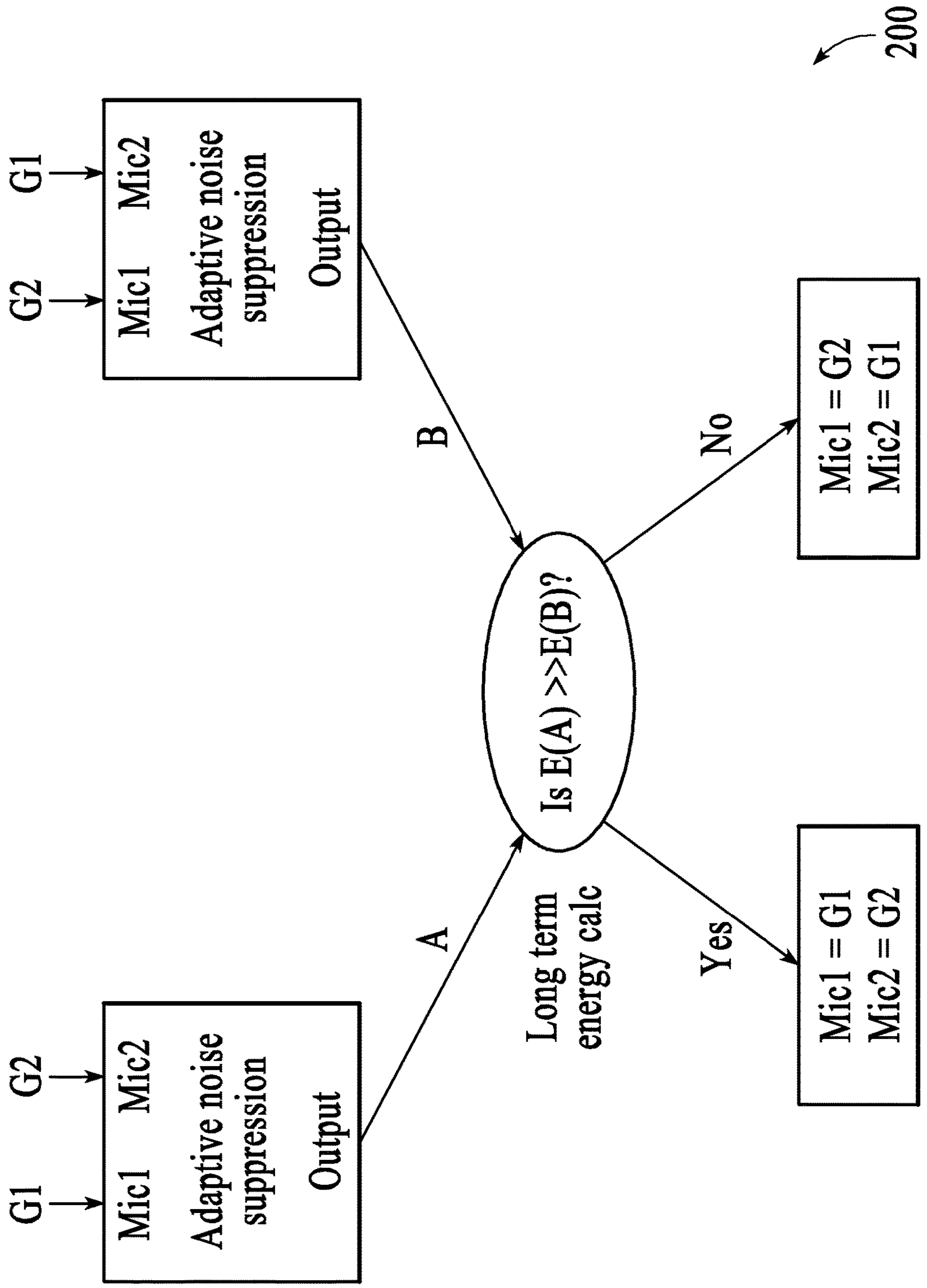
FIG. 2 is a block diagram showing microphone designation in the DMC, under an embodiment.

As an example, FIG. 2 is a block diagram showing microphone designation 200 in the DMC, under an embodiment. The noise response of the microphones being approximately equal facilitates Mic1 identification. Both configurations are used to suppress the noise, and the microphone that has the highest residual energy is used to output the speech. This functions because the speech will not be removed nearly as well as the noise, so the correct configuration will be the one with the highest energy residual. Thus, if in a given time period the total energy in a first microphone exceeds, by a given threshold, the energy in the second microphone, then the first microphone is assumed to be nearest the speaker's mouth.

More specifically, the microphone designation 200 receives a first signal A from the DMC having microphone G1 designated as Mic1 and microphone G2 designated as Mic2. The microphone designation 200 also receives a second signal B from the DMC having microphone G2 designated as Mic1 and microphone G1 designated as Mic2. The energy of signal A is compared with the energy of signal B. When the energy of signal A is higher than the energy of signal B, then microphone G1 is designated as Mic1 and microphone G2 is designated as Mic2 for all further operations of the DMC. When the energy of signal B is higher than the energy of signal A, then microphone G2 is designated as Mic1 and microphone G1 is designated as Mic2 for all further operations of the DMC.

The DMC 100 of an embodiment is coupled or connected to one or more remote devices. In this system configuration, the DMC 100 outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Furthermore, the DMC 100 of an embodiment can be a component or subsystem integrated with a host device. In this system configuration, the DMC outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Figure 3:
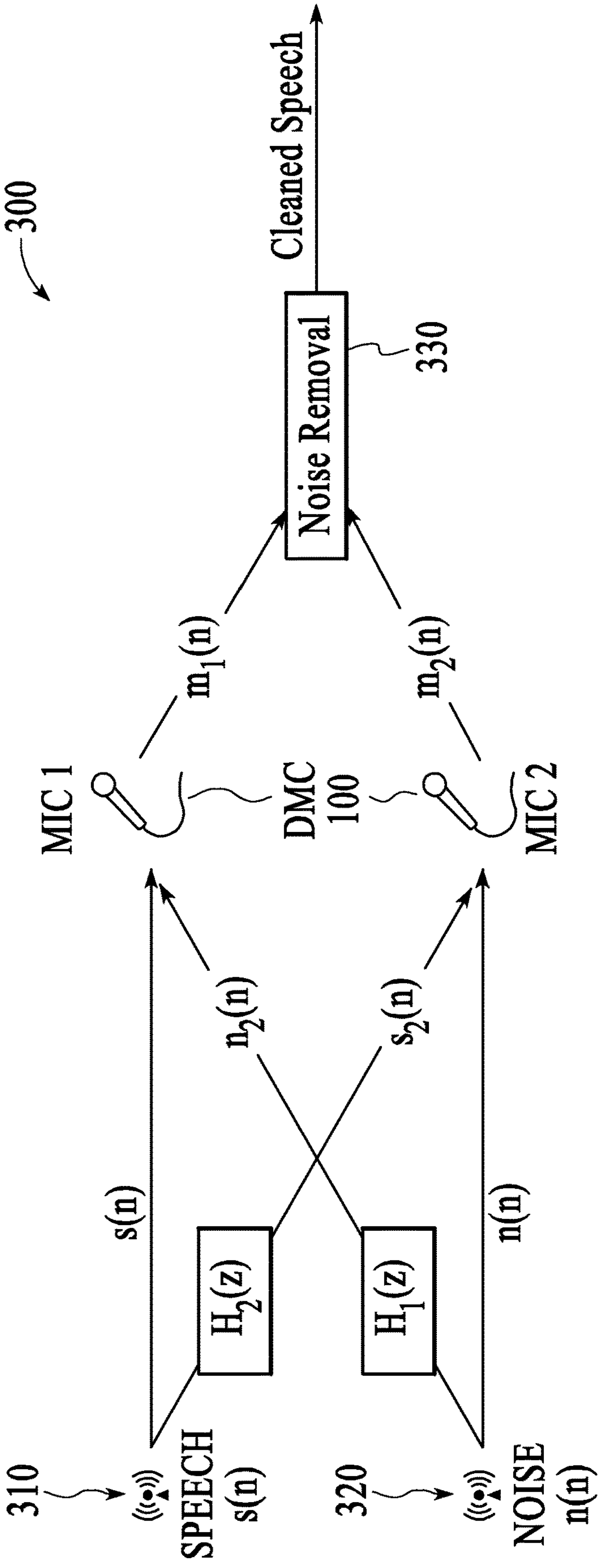
FIG. 3 is a system including the DMC coupled or connected to components of an adaptive filter system, under an embodiment.

As described above, the DMC can be coupled or connected to be a component of a system that includes an adaptive filter system. FIG. 3 is a system 300 including the DMC 100 coupled or connected to components of an adaptive filter system 330, under an embodiment. A single noise source 320 and a direct path to the microphones Mic1 and Mic2 are assumed. An operational description of the noise removal of an embodiment is provided using a single speech source 310 and a single noise source 320, but is not so limited. The system 300 uses two microphones which, in an embodiment, represent the DMC (e.g., microphones G1 and G2, or Mic1 and Mic2) described herein with reference to FIGS. 1 and 2. In this example, Mic1 is designated as a "speech" microphone and Mic2 is designated as a "noise" microphone, but the DMC is not so limited. The speech microphone Mic1 is assumed to capture mostly speech with some noise, while Mic2 captures mostly noise with some speech. The data from the speech source 310 to Mic1 is denoted by s(n), where s(n) is a discrete sample of the analog signal from the source 310. The data from the speech source 310 to Mic2 is denoted by s.sub.2(n). The data from the noise source 320 to Mic2 is denoted by n(n). The data from the noise source 320 to Mic1 is denoted by n.sub.2(n). Similarly, the data from Mic1 to noise removal element 330 is denoted by m.sub.1(n), and the data from Mic2 to noise removal element 330 is denoted by m.sub.2(n). The transfer function from the speech source 310 to Mic2 is denoted by H.sub.2(z), and the transfer function from the noise source 320 to Mic1 is denoted by H.sub.1(z).

The DMC 100 can be used with the Pathfinder system as the adaptive filter system 330 of system 300. Alternatively, any adaptive filter or noise removal algorithm can be used with the DMC in one or more various alternative embodiments or configurations.

The Pathfinder system generally provides adaptive noise cancellation by combining the two microphone signals (e.g., Mic1, Mic2) by filtering and summing in the time domain. The adaptive filter uses the signal received from the far microphone (e.g., Mic2) to remove noise from the speech received from the near microphone (e.g., Mic1), which relies on a slowly varying linear transfer function between the two microphones for sources of noise. Following processing of the two channels of the DMC (output of Mic1 is a first channel, output of Mic2 is a second channel), an output signal is generated in which the noise content is attenuated with respect to the speech content.

Tests using system 300 in a configuration including the DMC 100 described herein along with the Pathfinder noise suppression system have yielded signal-to-noise (SNR) improvements from 20 to 30 dB in extremely high noise environments (105+ dBA) in a range of frequencies of approximately 100 Hz to 3900 Hz. The system works equally well in low-noise environments, and higher sampling frequency operation is easily accomplished.

The system 300 of an embodiment including the adaptive filter system 330 and the DMC 100 can be coupled or connected to one or more remote devices. In this system configuration, the system 300 outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces. The adaptive filter system 330 can be a component of the DMC 100 or the remote device.

Furthermore, the system 300 of an embodiment including the adaptive filter system 330 and the DMC 100 can be a component or subsystem integrated with a host device. In this system configuration, the system 300 outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Figure 4:
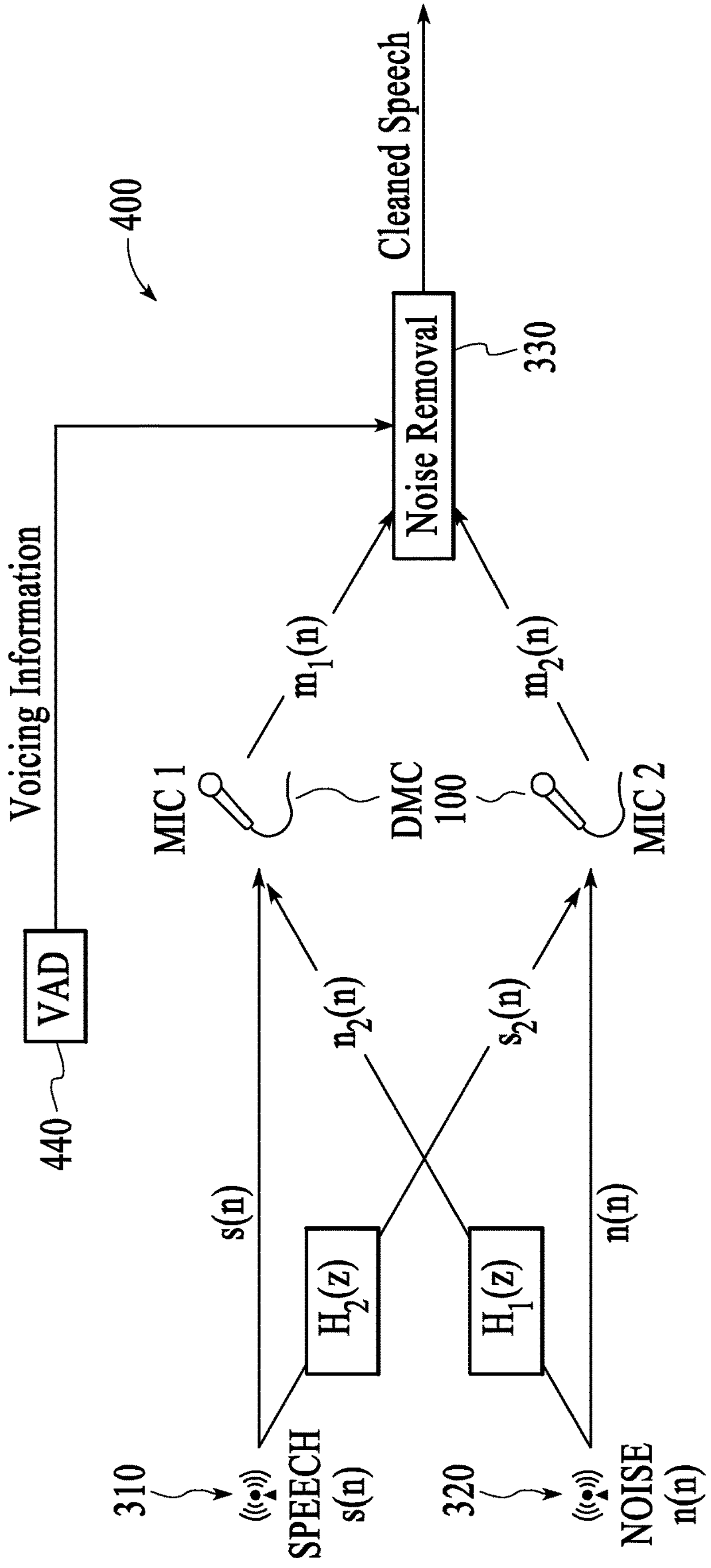
FIG. 4 is a system including the DMC coupled or connected to components of an adaptive filter system that includes a VAD, under an embodiment.

The DMC can also be coupled or connected as a component of a system that includes an adaptive filter system and a VAD. FIG. 4 is a system 400 including the DMC 100 coupled or connected to components of an adaptive filter system 330 that includes a VAD 440, under an embodiment. A single noise source 320 and a direct path to the microphones Mic1 and Mic2 are assumed. An operational description of the noise removal of an embodiment is provided using a single speech source 310 and a single noise source 320, but is not so limited. The system 300 uses two microphones which, in an embodiment, represent the DMC 100 described herein with reference to FIGS. 1 and 2. In this example, Mic1 is designated as a "speech" microphone and Mic2 is designated as a "noise" microphone. The speech microphone Mic1 is assumed to capture mostly speech with some noise, while Mic2 captures mostly noise with some speech. The data from the speech source 310 to Mic1 is denoted by s(n), where s(n) is a discrete sample of the analog signal from the source 310. The data from the speech source 310 to Mic2 is denoted by s.sub.2(n). The data from the noise source 320 to Mic2 is denoted by n(n). The data from the noise source 320 to Mic1 is denoted by n.sub.2(n). Similarly, the data from Mic1 to noise removal element 330 is denoted by m.sub.1(n), and the data from Mic2 to noise removal element 330 is denoted by m.sub.2(n).

The noise removal element 330 optionally receives a signal from a voice activity detection (VAD) element 440. The VAD 340 uses physiological and/or acoustic information to determine when a speaker is speaking. In various embodiments, the VAD can include at least one of an accelerometer, at least one conventional acoustic microphone, a skin surface microphone in physical contact with skin of a user, a human tissue vibration detector, a radio frequency (RF) vibration and/or motion detector/device, an electroglottograph, an ultrasound device, an acoustic microphone that is being used to detect acoustic frequency signals that correspond to the user's speech directly from the skin of the user (anywhere on the body), an airflow detector, and a laser vibration detector to name a few.

The strong proximity effect of the DMC 100 of an embodiment allows a simple acoustic-only VAD to be used using Mic1 of the DMC 100 to generate the VAD 440 data in system 300. In addition, the VAD data in system 300 may also be generated using information from both Mic1 and Mic2 of DMC 100. Also, the output of the noise removal system 330 may be used to generate VAD information. In extremely high noise environments, a non-acoustic speech vibration detector such as the Aliph Radio Vibrometer (ARV) (available from Aliph, San Francisco, Calif.) is recommended as a substitute or supplement to the acoustic VAD 440. This microphone configuration will however work with any VAD signal, or the VAD may be set to zero with only minor disruption of the denoised speech. This is because there is much more speech in Mic1 than in Mic2, a key to good performance.

The DMC 100 can be used with the Pathfinder system as the adaptive filter system of system 400. Alternatively, any adaptive filter or noise removal algorithm and any VAD can be used with the DMC 100 in one or more various alternative embodiments or configurations.

The system 400 including the adaptive filter system 330, the VAD 440, and the DMC 100 of an embodiment can be coupled or connected to one or more remote devices. In this system configuration, the system 400 outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces. The adaptive filter system 330 can be a component of the DMC 100 or the remote device. Similarly, the VAD 440 can be a component of the adaptive filter system 330, the DMC 100 or the remote device.

Furthermore, the system 400 of an embodiment including the adaptive filter system 330, the VAD 440, and the DMC 100 can be a component or subsystem integrated with a host device. In this system configuration, the system 400 outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

The DMC can be a component of a single system, multiple systems, and/or geographically separate systems, The DMC can also be a subcomponent or subsystem of a single system, multiple systems, and/or geographically separate systems. The DMC can be coupled to one or more other components (not shown) of a host system or a system coupled to the host system.

One or more components of the DMC and/or a corresponding system or application to which the DMC is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the DMC can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Embodiments of the DMC and corresponding systems and methods described herein include a device comprising: a boom having two receptacles that define an axis; a first microphone connected to the boom, the first microphone having a first vector normal to a front of the first microphone, the first vector approximately parallel with the axis; and a second microphone connected to the boom and positioned a first distance from the first microphone, the second microphone having a second vector normal to a front of the second microphone, wherein the second vector forms an angle relative to the first vector.

The angle of an embodiment is approximately zero (0) degrees.

The angle of an embodiment is in a range of approximately zero (0) degrees to 45 degrees.

The first vector of an embodiment is separated from the second vector by a vector distance in a range of approximately zero (0) to 15 mm.

The first distance of an embodiment is in a range of approximately 1 millimeter (mm) to 30 mm.

The first distance of an embodiment is in a range of approximately 30 mm to 50 mm.

The first microphone of an embodiment is positioned a second distance from a mouth of a speaker wearing the boom.

The second distance of an embodiment is in a range of approximately 0 to 10 mm.

The first distance of an embodiment is in a range of approximately 1 mm to 30 mm, wherein the first microphone of an embodiment is positioned a second distance from a mouth of a speaker wearing the boom, the second distance of an embodiment in a range of approximately 0 to 10 mm.

The axis of an embodiment is oriented in a direction toward a mouth of a user.

A space between the first microphone and the second microphone of an embodiment is air.

Embodiments of the DMC and corresponding systems and methods described herein include a device comprising: a headset including at least one loudspeaker, wherein the headset attaches to a region of a human head; and a microphone array connected to the headset, the microphone array including a first microphone and a second microphone, the first microphone having a first vector normal to a front of the first microphone, the first vector defining an axis, and the second microphone positioned a first distance from the first microphone, the second microphone having a second vector normal to a front of the second microphone, wherein the second vector forms an angle relative to the first vector.

The angle of an embodiment is approximately zero (0) degrees.

The angle of an embodiment is in a range of approximately zero (0) degrees to 45 degrees.

The first vector of an embodiment is separated from the second vector by a vector distance in a range of approximately zero (0) to 15 mm.

The first distance of an embodiment is in a range of approximately 1 millimeter (mm) to 30 mm.

The first distance of an embodiment is in a range of approximately 30 mm to 50 mm.

The first microphone of an embodiment is positioned a second distance from a mouth of a human wearing the headset.

The second distance of an embodiment is in a range of approximately 0 to 10 mm.

The first distance of an embodiment is in a range of approximately 1 mm to 30 mm, wherein the first microphone of an embodiment is positioned a second distance from a mouth of a human wearing the headset, the second distance of an embodiment in a range of approximately 0 to 10 mm.

The axis of an embodiment is oriented in a direction toward a mouth of a human wearing the headset.

A space between the first microphone and the second microphone of an embodiment is air.

The device of an embodiment comprises a voice activity detector (VAD) connected to the headset, the VAD generating voice activity signals. The first microphone of an embodiment generates the voice activity signals.

The device of an embodiment comprises an adaptive noise removal application coupled to the headset. The adaptive noise removal application of an embodiment receives acoustic signals from the microphone array and generating an output signal, wherein the output signal is a denoised acoustic signal.

The device of an embodiment comprises a communication channel coupled to the headset. The communication channel of an embodiment comprises at least one of a wireless channel, a wired channel, and a hybrid wireless/wired channel.

The device of an embodiment comprises a communication device coupled to the headset via the channel. The communication device of an embodiment comprises one or more of cellular telephones, satellite telephones, portable telephones, wireline telephones, Internet telephones, wireless transceivers, wireless communication radios, personal digital assistants (PDAs), and personal computers (PCs).

Embodiments of the DMC and corresponding systems and methods described herein include a device comprising: a first microphone having a first vector normal to a front of the first microphone, the first vector approximately parallel with an axis oriented in a direction toward a mouth of a speaker, wherein the first microphone is positioned a first distance from the mouth; and a second microphone positioned a second distance from the first microphone, the second microphone having a second vector normal to a front of the second microphone, wherein the second vector forms an angle relative to the first vector, wherein the angle is in a range of approximately zero (0) degrees to 45 degrees.

The second distance of an embodiment is in a range of approximately 1 millimeter (mm) to 30 mm.

The second distance of an embodiment is in a range of approximately 30 mm to 50 mm.

The first distance of an embodiment is in a range of approximately 0 to 10 mm.

The device of an embodiment comprises an adaptive noise removal application coupled to the first microphone and the second microphone. The adaptive noise removal application of an embodiment receives acoustic signals from the first microphone and the second microphone and generates an output signal, wherein the output signal is a denoised acoustic signal.

The device of an embodiment comprises a voice activity detector (VAD) coupled to the adaptive noise removal application, the VAD generating voice activity signals.

Embodiments of the DMC and corresponding systems and methods described herein include a system comprising: a first microphone having a first vector normal to a front of the first microphone, the first vector approximately parallel with an axis oriented in a direction toward a mouth of a speaker, wherein the first microphone is positioned a first distance from the mouth; a second microphone positioned a second distance from the first microphone, the second microphone having a second vector normal to a front of the second microphone, wherein the second vector forms an angle relative to the first vector, wherein the angle is in a range of approximately zero (0) degrees to 45 degrees; and an adaptive noise removal application receiving acoustic signals from the first microphone and the second microphone and generating an output signal, wherein the output signal is a denoised acoustic signal.

Aspects of the DMC and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the DMC and corresponding systems and methods include: microcontrollers with memory (such as electronically erasable programmable read only memory (EEPROM)), embedded microprocessors, firmware, software, etc. Furthermore, aspects of the DMC and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the DMC and corresponding systems and methods is not intended to be exhaustive or to limit the systems and methods to the precise forms disclosed. While specific embodiments of, and examples for, the DMC and corresponding systems and methods are described herein for illustrative purposes, various equivalent modifications are possible within the scope of the systems and methods, as those skilled in the relevant art will recognize. The teachings of the DMC and corresponding systems and methods provided herein can be applied to other systems and methods, not only for the systems and methods described above.

The elements and acts of the various embodiments described above can be combined to provide further embodiments. These and other changes can be made to the DMC and corresponding systems and methods in light of the above detailed description.

In general, in the following claims, the terms used should not be construed to limit the DMC and corresponding systems and methods to the specific embodiments disclosed in the specification and the claims, but should be construed to include all systems that operate under the claims. Accordingly, the DMC and corresponding systems and methods is not limited by the disclosure, but instead the scope is to be determined entirely by the claims.

While certain aspects of the DMC and corresponding systems and methods are presented below in certain claim forms, the inventors contemplate the various aspects of the DMC and corresponding systems and methods in any number of claim forms. Accordingly, the inventors reserve the right to add additional claims after filing the application to pursue such additional claim forms for other aspects of the DMC and corresponding systems and methods.

What is claimed:

1. A device comprising:

a microphone support;

first and second directional microphones connected to the microphone support and separated by a first distance along an axis, the first directional microphone having a first vector normal to a first front of the first directional microphone, the first vector approximately parallel with the axis, the second directional microphone having a second vector normal to a second front of the second directional microphone, the second vector forming an angle relative to the first vector;

a vent positioned in proximity to the first directional microphone, the second directional microphone, or both, the vent configured to cause the first directional microphone, the second directional microphone, or both to mimic a conventional close-talk microphone; and logic configured to determine whether the first directional microphone or the second directional microphone is closer to a source of speech.

2. The device of claim 1, wherein the angle is approximately zero (0) degrees.

3. The device of claim 1, wherein the angle is in a range of approximately zero (0) degrees to 45 degrees.

4. The device of claim 1, wherein the first vector is separated from the second vector by a vector distance in a range of approximately zero (0) to 15 mm.

5. The device of claim 1, wherein the first distance is in a range of approximately 1 millimeter (mm) to 30 mm.

6. The device of claim 1, wherein the first distance is in a range of approximately 30 mm to 50 mm.

7. The device of claim 1, wherein the first distance is in a range of approximately 1 mm to 30 mm, wherein the first directional microphone is positioned a second distance from a mouth of a speaker wearing the boom, the second distance in a range of approximately 0 to 10 mm.

8. The device of claim 1, wherein the axis is oriented in a direction toward a mouth of a human wearing the microphone support.

9. The device of claim 1, wherein a space between the first directional microphone and the second directional microphone is air.

10. The device of claim 1, wherein the microphone support comprises a boom having a first receptacle configured to receive and hold the first directional microphone and a second receptacle configured to receive and hold the second directional microphone.

11. The device of claim 1, wherein the microphone support comprises a headset including at least one loudspeaker, wherein the headset attaches to a region of a human head.

12. The device of claim 1, further comprising an adaptive noise removal application coupled to the microphone support, the adaptive noise removal application receiving acoustic signals from at least one of the first and second directional microphones and generating an output signal, wherein the output signal is a denoised acoustic signal.

13. The device of claim 1, wherein the first directional microphone is positioned a second distance from a mouth of a speaker wearing the microphone support.

14. The device of claim 13, wherein the second distance is in a range of approximately 0 to 10 mm.

15. The device of claim 1, further comprising a voice activity detector (VAD) connected to the microphone support, the VAD generating voice activity signals.

16. The device of claim 15, wherein the first directional microphone generates the voice activity signals.

17. The device of claim 1, further comprising a communication channel coupled to the microphone support, the communication channel comprising at least one of a wireless channel, a wired channel, or a hybrid wireless/wired channel.

18. The device of claim 17, further comprising a communication device coupled to the microphone support via the channel, the communication device comprising one or more of a cellular telephone, a satellite telephone, a portable telephone, a wireline telephone, an Internet telephone, a wireless transceiver, a wireless communication radio, a personal digital assistants (PDA), or a personal computer (PC).

19. The device of claim 1, further comprising an adaptive noise removal application coupled to the first directional microphone and the second directional microphone, the adaptive noise removal application receiving acoustic signals from the first directional microphone and the second directional microphone and generating an output signal, wherein the output signal is a denoised acoustic signal.

20. The device of claim 19, further comprising a voice activity detector (VAD) coupled to the adaptive noise removal application, the VAD generating voice activity signals.

* * * * *